US008810643B2

(12) United States Patent
Shigeeda

(10) Patent No.: US 8,810,643 B2
(45) Date of Patent: Aug. 19, 2014

(54) IMAGE CAPTURING APPARATUS AND CONTROL METHOD THEREOF

(75) Inventor: Soichiro Shigeeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 12/828,691

(22) Filed: Jul. 1, 2010

(65) Prior Publication Data
US 2011/0007145 A1 Jan. 13, 2011

(30) Foreign Application Priority Data
Jul. 7, 2009 (JP) ................................. 2009-161240

(51) Int. Cl.
H04N 7/18 (2006.01)
H04N 5/232 (2006.01)

(52) U.S. Cl.
CPC .................................. *H04N 5/232* (2013.01); *H04N 5/23245* (2013.01)
USPC .......................................................... 348/81

(58) Field of Classification Search
CPC .................................................... H04N 7/183
See application file for complete search history.

(56) References Cited

U.S. PATENT DOCUMENTS

| 4,427,282 | A * | 1/1984 | Fujino et al. ................... 396/505 |
| 5,745,175 | A * | 4/1998 | Anderson ..................... 348/345 |
| 6,778,770 | B1 * | 8/2004 | Cazier et al. .................... 396/77 |
| 7,522,191 | B2 * | 4/2009 | Hara et al. ................. 348/223.1 |
| 7,978,248 | B2 * | 7/2011 | Terashima ............... 348/333.05 |
| 2002/0180873 | A1 * | 12/2002 | Misawa ..................... 348/231.6 |
| 2005/0157178 | A1 * | 7/2005 | Miyata ..................... 348/207.99 |
| 2005/0281552 | A1 * | 12/2005 | Konishi et al. ................ 396/301 |
| 2008/0253756 | A1 * | 10/2008 | Gourova ......................... 396/27 |
| 2009/0040331 | A1 * | 2/2009 | Kitagawa ................... 348/222.1 |
| 2010/0079589 | A1 * | 4/2010 | Yoshida et al. ................. 348/81 |

FOREIGN PATENT DOCUMENTS

| JP | 2003-274268 | 9/2003 |
| JP | 2004-336326 A | 11/2004 |
| JP | 2006-171355 | 6/2006 |
| JP | 2007-081772 A | 3/2007 |

OTHER PUBLICATIONS

The above references were cited in a May 24, 2013 Japanese Office Action, which is enclosed without English Translation, that issued in Japanese Patent Application No. 2009-161240.

* cited by examiner

Primary Examiner — Sath V Perungavoor
Assistant Examiner — Kate Luo
(74) Attorney, Agent, or Firm — Cowan, Liebowitz & Latman, P.C.

(57) ABSTRACT

In an image capturing apparatus having a plurality of shooting modes, the shooting mode can be switched to a shooting mode sharing a pre-determined relationship, with a simple operation. Specifically, whether the currently set shooting mode has been associated with other shooting modes is determined when a pre-determined operation input is detected. If the currently set shooting mode is associated with other shooting modes, the shooting mode is switched to one of the other shooting modes sharing the pre-determined relationship with the current shooting mode.

8 Claims, 4 Drawing Sheets

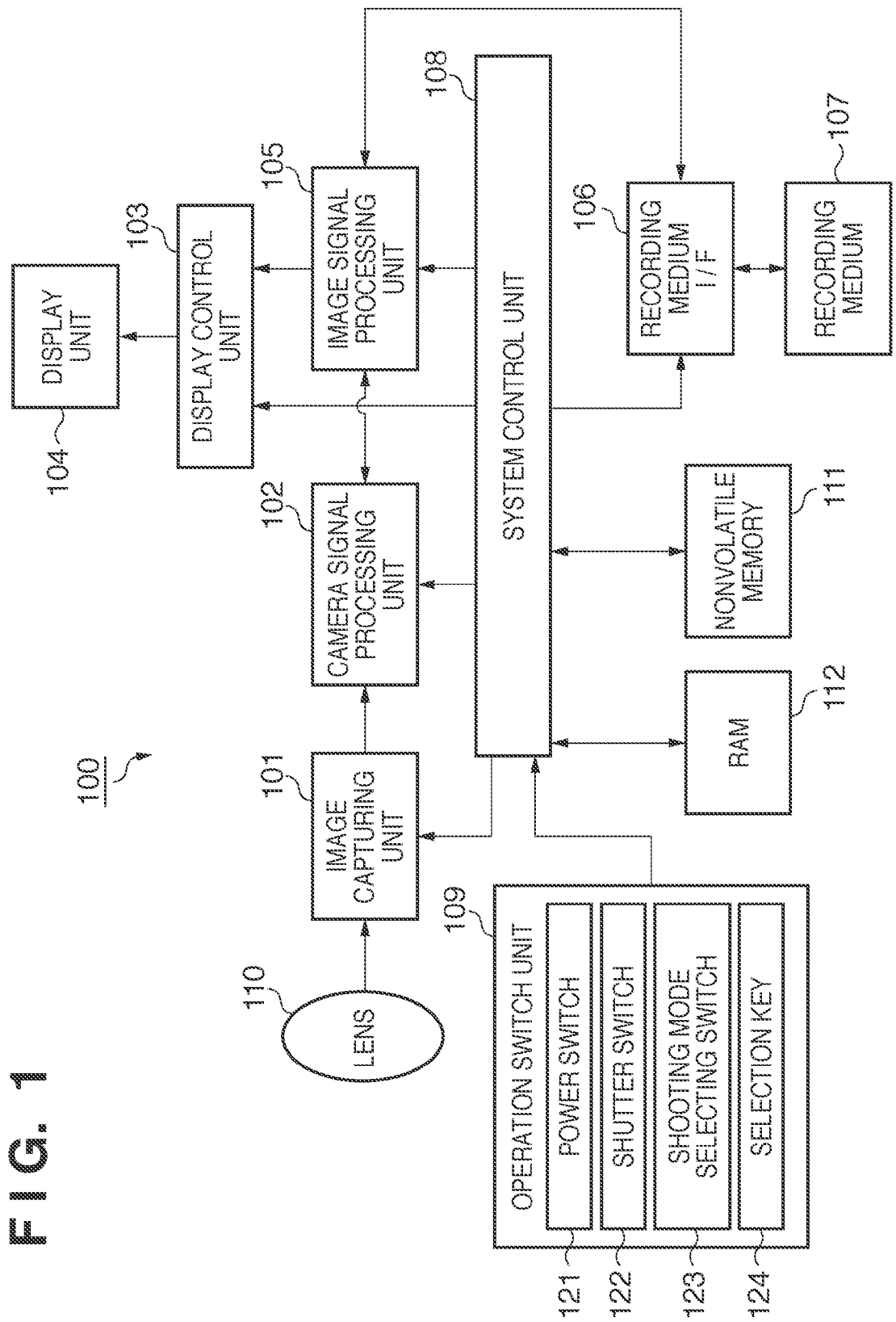

IMAGE CAPTURING APPARATUS AND CONTROL METHOD THEREOF

BACKGROUND OF THE INVENTION

1. Field of the Invention

The present invention relates to an image capturing apparatus and a control method thereof, and more particularly to an image capturing apparatus that provides a plurality of shooting settings adjusted according to the shooting environment of subjects as shooting modes in advance, and enables the user select a shooting mode when shooting images, and a control method thereof.

2. Description of the Related Art

Image capturing apparatuses have a large number of user-settable items such as aperture, shutter speed, white balance, sensitivity and flash. Setting these items appropriately according to the states of various scenes not only requires knowledge and experience, but also requires great care. In view of this, image capturing apparatuses are known wherein shooting modes for particular scenes that have been associated with settings considered preferable to shoot the given scenes are provided in advance. Users can, by selecting a shooting mode appropriate for a scene to be shot, make settings suitable for the scene collectively in relation to a plurality of items. Specifically, for example, in a portrait mode, the aperture value is set to a small value so as to bring the subject to the forefront with the background blurred when the subject is shot. In a nightscape mode, the shutter speed is set slow and the flash is set to off, so that it is possible to take the shot without spoiling the atmosphere of the nightscape.

Furthermore, image capturing apparatuses that assist selection of a shooting mode appropriate for a scene are also known. Japanese Patent Laid-Open No. 2003-274268 proposes a function that analyzes the state of a shooting environment and thereby limits selectable shooting modes, and allows the user to easily select a shooting mode suitable for the current shooting environment.

Japanese Patent Laid-Open No. 2006-171355 proposes an image capturing apparatus in which the shooting mode is switched to an underwater mode when the image capturing apparatus is installed into a waterproof case for underwater shooting and then the image capturing apparatus is started up with the use of a pseudo button provided in the case.

However, because the image capturing apparatus disclosed in Japanese Patent Laid-Open No. 2003-274268 requires analysis of the shooting environment, there is a possibility that the processing load required for analysis may increase. In addition, the shooting mode that the user needs may not be included in the selection options, depending on the result of the analysis. Moreover, this patent document does not give special consideration to the order that selection options are listed.

In the case of the image capturing apparatus of Japanese Patent Laid-Open No. 2006-171355 in which the shooting mode is automatically switched by installing the image capturing apparatus into a case for enabling underwater shooting, the following possibilities can be considered when, for example, an underwater shooting mode is automatically selected. When a user shoots underwater, there is a possibility that the user might shoot images not only underwater but also on beach. If the user shoots images on the beach with the underwater shooting mode, optimal results may not be obtained, such as the color of shot images being different from the actual subject color. Accordingly, when shooting images on the beach with the image capturing apparatus installed in a case for enabling underwater shooting, the user has to perform operations such as taking the image capturing apparatus out of the case to switch the shooting mode, which makes it difficult for the user to easily switch the shooting mode.

SUMMARY OF THE INVENTION

The present invention has been conceived in view of the problems encountered with conventional technology as described above. The present invention provides an image capturing apparatus having a plurality of shooting modes that enables switching to a shooting mode that shares a pre-determined relationship with the currently selected shooting mode with a simple operation, and a control method thereof.

The present invention in its first aspect provides an image capturing apparatus having a plurality of shooting modes comprising: an operation unit which detects an operation input from a user; and a mode changing unit which selects one of the plurality of shooting modes, including at least a normal mode, an underwater mode and a beach mode, and sets the one of the plurality of shooting modes in the image capturing apparatus, wherein the mode changing unit determines whether a currently set shooting mode is the underwater mode or the beach mode, and in a case where the underwater mode or the beach mode is set, switches between the underwater mode and the beach mode in response to a pre-determined operation input detected by the operation unit.

Further features of the present invention will become apparent from the following description of exemplary embodiments with reference to the attached drawings.

BRIEF DESCRIPTION OF THE DRAWINGS

FIG. 1 is a block diagram showing an example of a functional configuration of a digital camera as an example of an image capturing apparatus according to an embodiment of the present invention.

DESCRIPTION OF THE EMBODIMENTS

Figure 2A:
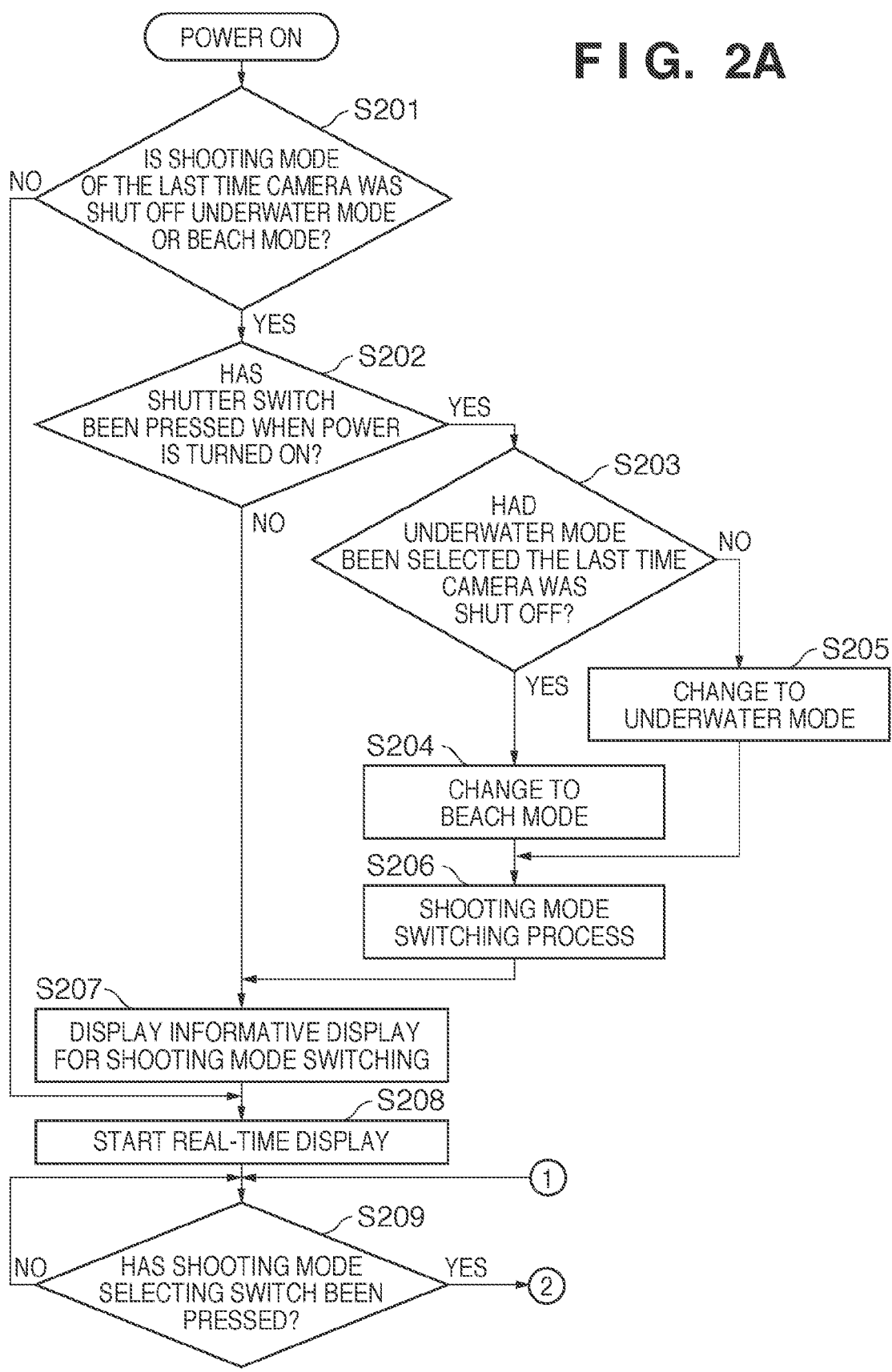
FIGS. 2A and 2B are flowcharts illustrating a shooting mode switching process of a digital camera according to embodiment.

Hereinafter, exemplary embodiments of the present invention will be described in detail with reference to the drawings. It should be noted that the embodiments described below are examples in which the present invention is applied to a digital camera as an example of an image capturing apparatus in which a plurality of user selectable shooting modes are provided in advance.

In a digital camera 100 shown in FIG. 1, an operation switch unit 109 is an interface with which the user can input instructions to the digital camera 100, and that includes, for example, a power switch 121, a shutter switch 122, a shooting mode selecting switch 123, and a selection key 124. The operation switch unit 109 may include, for example, physical buttons provided on the digital camera 100, or if a display unit 104 is a touch panel display, for example, regions of the touch panel display may function as buttons. The operation switch unit 109 transmits instructions input from the user to a system control unit 108. The system control unit 108 controls all operations in the digital camera 100, and executes a program for controlling the respective blocks that are stored in a nonvolatile memory 111 by expanding the program in a RAM 112. The nonvolatile memory 111 stores settings of the digital camera 100 corresponding to each of a plurality of shooting modes, various default setting values and current setting values of the digital camera 100, GUI data such as a menu screen, information regarding relationship between shooting modes, which will be described later, and so on. Current settings of the digital camera 100 include information regarding a currently set shooting mode, for example.

An image capturing unit 101 receives incident light from a subject through a lens 110, and outputs the received light as an image signal to a camera signal processing unit 102. The camera signal processing unit 102 applies pre-determined signal processing on the input image signal such as A/D conversion, signal level adjustment, pixel interpolation or color conversion, and outputs the signal to an image signal processing unit 105. The image signal processing unit 105 applies, for example, a compression/decompression or enlargement/reduction process on the input image signal to which signal processing has been applied, and transmits the signal to a recording medium interface (I/F) unit 106 and a display control unit 103.

The recording medium interface unit 106 records the image signal performed the above processing by the image signal processing unit 105 in a recording medium 107. The recording medium 107 may be built in the digital camera 100 or may be removable.

The display control unit 103 controls display of the image signals processed by the image signal processing unit 105 and the image signals recorded in the recording medium 107, and display of operation procedures and status of the digital camera 100 stored in, for example, the nonvolatile memory 111 on an information presentation screen, and causes the display unit 104 to display the screen. The display unit 104 can be, for example, a compact liquid crystal display device, and is intended for presenting information to the user.

Examples of shooting modes that the digital camera 100 provides in advance assuming the shooting environments of subjects include the following:

a portrait mode in which the background is blurred and people is brought to the forefront;

a sports mode in which even a quickly moving subject can be shot without subject blur;

a snow mode in which people can be shot even against a snowscape background without making the people dark and taking on a blue tinge;

a sunset mode in which shooting is possible with an enhanced silhouette and emphasized a red tinge;

a nightscape mode in which people is shot with emitting flash light and the background is shot at a low shutter speed without emitting flash light;

a night snapshot mode in which a nightscape and people can be shot clearly without using a tripod;

a spotlight mode in which a spot-lighted subject can be shot without highlight detail loss;

a fireworks mode in which fireworks can be shot vividly with an optimal exposure;

an underwater mode in which a white balance optimal for underwater conditions is set, and a blue tinge are suppressed; and a beach mode in which people can be shot even against the ocean surface or beach where sunlight is strongly reflected without making the people dark.

The digital camera 100 of the present embodiment manages at least two of the plurality of shooting modes by associating shooting modes that share a pre-determined relationship to each other. Examples of shooting modes that share the pre-determined relationship include at least two of the plurality of shooting modes that can be used for the same scene, or shooting modes corresponding to difference scenes that have an association with each other. Other examples include a plurality of shooting modes that have a high frequency of use in the past. The information regarding such shooting modes sharing the pre-determined relationship is assumed to be stored in the nonvolatile memory 111.

Of the plurality of exemplary shooting modes, the shooting modes that can be used for the same scene include, in the case of nightscape scenes, for example, the nightscape mode, the night snapshot mode and the fireworks mode. Examples of the shooting modes corresponding to difference scenes that share the pre-determined relationship to each other include the underwater mode and the beach mode.

The digital camera 100 of the present embodiment assists switching of shooting modes, in consideration of shooting modes that share the pre-determined relationship with the currently set shooting mode or the shooting mode set on start up (in other words, on the last time shut off). The digital camera 100 of the present embodiment also assists efficient switching or selection of shooting modes by controlling a GUI display method for switching between shooting modes.

In addition, a case can be conceived in which the digital camera 100 of the present embodiment is installed into a waterproof case to shoot underwater and thus the shooting mode selecting button is inoperable. Because the underwater mode and the beach mode are likely to be used when the digital camera 100 is installed in a waterproof case, these two modes are configured to be able to switch with an operation of an operable operation member at least when the digital camera 100 is installed into a waterproof case while these modes are set. In other words, because the shutter switch and the power switch are operation members that need to be operated even when the digital camera 100 is installed in a waterproof case, when the digital camera 100 is installed in a waterproof case, the underwater mode and the beach mode may be switched by, for example, simultaneously pressing these two buttons.

Figure 2B:
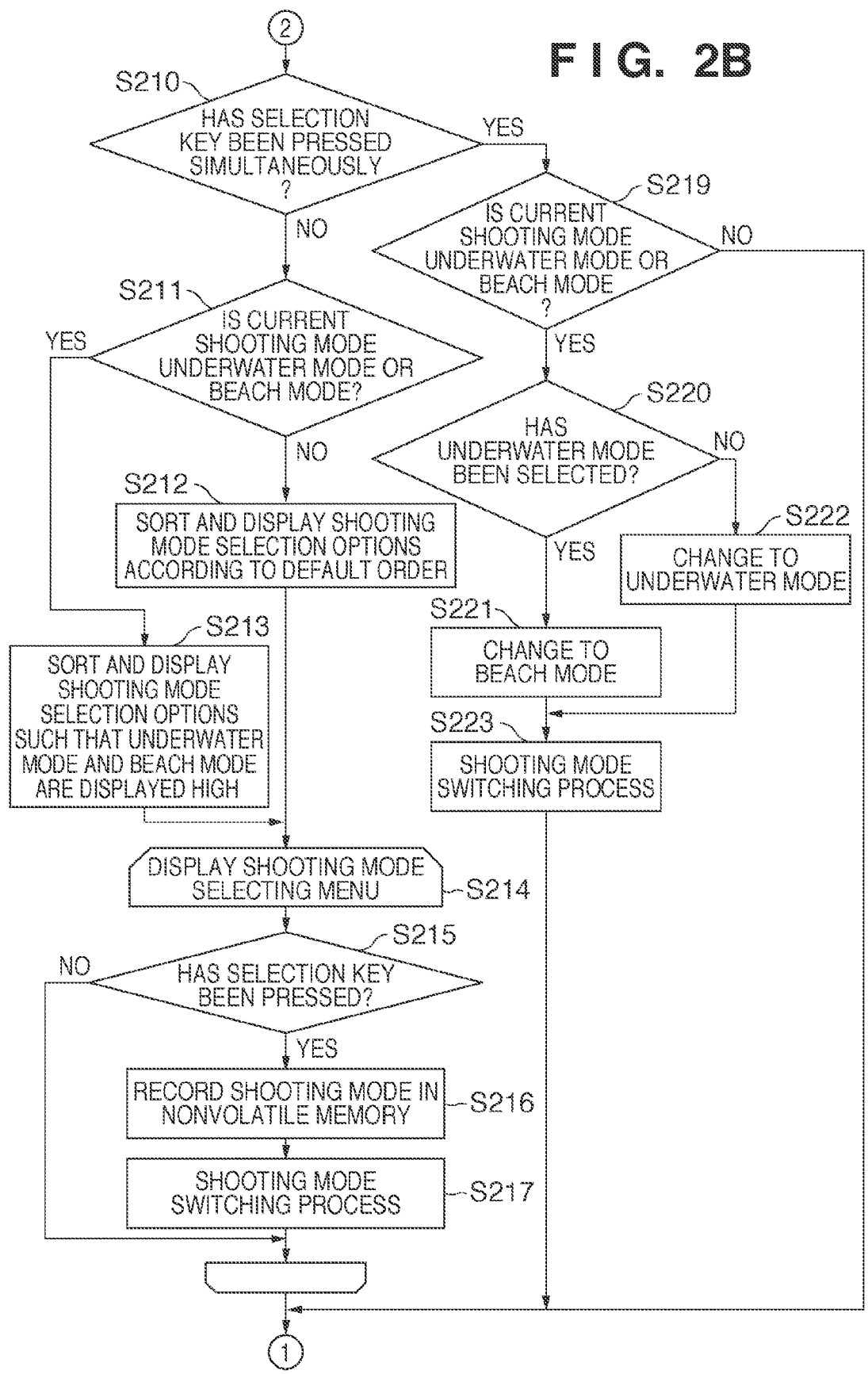

A shooting mode switching process of a digital camera 100 according to an embodiment configured as described above will be described with reference to the flowchart shown in FIGS. 2A and 2B.

When the power is turned on through an operation of the power switch 121, the system control unit 108 checks whether the information regarding the shooting mode of the last time the digital camera 100 was shut off (turned off) that is stored in the nonvolatile memory 111 is a shooting mode to be subjected to a switching control process on start-up (S201). In this example, it is assumed that the underwater mode and the beach mode are modes to be subjected to the switching control process on start-up. If the shooting mode of the last time the digital camera 100 was shut off was neither the underwater mode nor the beach mode, the system control unit 108 advances the process to S208.

If, on the other hand, either the underwater mode or the beach mode had been set the last time the digital camera 100 was shut off, the system control unit 108 determines whether a pre-determined instruction has been input together with the instruction to turn on power, for example, whether the shutter switch 122 has been pressed (S202).

If the shutter switch 122 has been pressed together with the instruction to turn on power, the system control unit 108 determines whether the shooting mode of the last time the digital camera 100 was shut off was the underwater mode (S203). If the shooting mode of the last time when the digital camera 100 was shut off was the underwater mode, the system control unit 108 changes the information regarding the current shooting mode stored in the nonvolatile memory 111 to the beach mode (S204). If the shooting mode of the last time the digital camera 100 was shut off was the beach mode, the system control unit 108 changes the information regarding the current shooting mode stored in the nonvolatile memory 111 to the underwater mode (S205). The system control unit 108 reads the settings of the digital camera 100 for the current shooting mode that are stored in the nonvolatile memory 111, and changes the settings of the respective blocks of the digital camera 100 in accordance with the read settings (S206).

In S207, the system control unit 108 reads an informative display for the switching control process on start-up from the nonvolatile memory 111, and causes the display unit 104 to display (notify) the informative display. As the informative display, for example, the current shooting mode and a message indicating that switching to a shooting mode that shares the pre-determined relationship with the current shooting mode can be carried out by performing a switching control process on start-up are displayed. Specifically, if the shooting mode when the digital camera 100 was shut off was either the underwater mode or the beach mode, for example, a message is displayed as the informative display indicating that the mode can be switched to whichever of the underwater mode or the beach mode that has not been selected by pressing the shutter switch 122 when the power is turned on. The system control unit 108 automatically ends the display of the informative display after a display time that is pre-determined and stored in the nonvolatile memory 111 has elapsed, or ends the informative display through an operation of the shutter switch 122 or the like, and advances the process to S208.

When the informative display ends, the system control unit 108 starts a live view display in order to cause the display unit 104 to function as an electronic viewfinder. In other words, the system control unit 108 causes the image capturing unit 101 to continuously shoot images, and uses the digital camera 100 signal processing unit 102, the image signal processing unit 105 and the display control unit 103 to sequentially display images on the display unit 104 (S208). In this state, the digital camera 100 goes into a standby state for shooting, and shooting is possible with an operation input to the shutter switch 122.

In the shooting standby state, the system control unit 108 determines whether the shooting mode selecting switch 123 provided in the digital camera 100 has been pressed (an instruction to display a shooting mode selecting menu screen has been made) (S209). If it is determined that the shooting mode selecting switch 123 has been pressed, the system control unit 108 determines whether input of a pre-determined instruction has been received, for example, whether the selection key 124 has been pressed, together with the instruction from the shooting mode selecting switch 123 (S210).

If there is no input from the selection key 124 together with the instruction from the shooting mode selecting switch 123, the system control unit 108 performs the following processing. The system control unit 108 determines whether the information regarding the current shooting mode stored in the nonvolatile memory 111 is a shooting mode to be subjected to a switching control process on shooting standby (S211). In this example, as in the switching control process on start-up, the underwater mode and the beach mode are assumed to be modes to be subjected to the switching control process on shooting standby.

If the current shooting mode is neither the underwater mode nor the beach mode, the system control unit 108 sorts a display order stored in the nonvolatile memory 111 in which shooting modes are displayed on the shooting mode selecting menu, and displays the result on the display unit 104 (S212). Specifically, the system control unit 108 sorts the shooting mode display order on the shooting mode selecting menu according to the factory-default display order set in the digital camera 100. The shooting mode selecting menu is also a menu screen in which selectable shooting modes are displayed as selection options. In the present embodiment, part of the display region of the display unit 104 is not hidden even when the shooting mode selecting menu is displayed, and part of the live view display is displayed in parallel with the shooting mode selecting menu. As will be described later, when the currently selected shooting mode is switched on the shooting mode selecting menu, the display is temporarily switched and viewed in that shooting mode. Accordingly, the user can, by viewing the live view display part, check how the subject will be shot in the temporarily selected shooting mode and determine the shooting mode to be switched to.

If, on the other hand, the current shooting mode is the underwater mode or the beach mode, the system control unit 108 sorts the shooting mode display order on the shooting mode selecting menu stored in the nonvolatile memory 111, and displays the result on the display unit 104 (S213). Specifically, the system control unit 108 sorts the shooting mode display order on the shooting mode selecting menu such that shooting modes that share the pre-determined relationship are displayed high in the order. For example, the system control unit 108 performs sorting such that the current shooting mode (the underwater mode in this example) and a shooting mode (the beach mode) that is managed as a shooting mode sharing the pre-determined relationship with the current shooting mode are displayed at the top of the menu display, and displays the result on the display unit 104.

Here, when displaying the shooting mode selecting menu, shooting modes that are not currently selected or that do not share the pre-determined relationship with the current shooting mode may be displayed collectively as a single selection option. In other words, taking the above as an example, only the three items "underwater mode", "beach mode" and "other shooting modes" may be displayed. If the user selects "other shooting modes", the system control unit 108 displays shooting modes other than the underwater mode and the beach mode on the shooting mode selecting menu in, for example, the factory-default display order.

In the steps from S214 to S217, a process corresponding to a user operation is performed on the shooting mode selecting menu sorted as described above.

When the shooting mode selecting menu is displayed on the display unit 104, the system control unit 108 determines whether the selection key 124 has been pressed (S215). If the shooting mode selected on the display of the shooting mode selecting menu is changed by input from the selection key 124, the system control unit 108 updates the display of the shooting mode selecting menu, and performs a process for temporarily switching the shooting mode. Specifically, first, the system control unit 108 stores the information regarding the selected shooting mode in the nonvolatile memory 111 as a temporarily selected shooting mode (S216). Next, the system control unit 108 reads, from the nonvolatile memory 111, the settings of the digital camera 100 for the temporarily selected shooting mode, and changes the settings of the respective blocks of the digital camera 100 in accordance with the read settings (S217). At this time, the temporarily selected shooting mode is reflected in live view display images displayed in parallel with the display of the shooting mode selecting menu. If, for example, the temporarily selected shooting mode is the portrait mode, the aperture value is set to a small value by the image capturing unit 101, and therefore images with a shallow depth of field and a blurred background to the subject are obtained.

The process from S214 to S217 is performed repeatedly until the user inputs an instruction to determine a shooting mode or until the user makes an input to end the display of the shooting mode selecting menu rather than determining a shooting mode. If there is an input to determine a shooting mode, the system control unit 108 reads out the information regarding the temporarily selected shooting mode stored in the nonvolatile memory 111, overwrites the information regarding the current shooting mode stored in the nonvolatile memory 111, and ends the display of the shooting mode selecting menu. Then, the system control unit 108 returns the process to S209.

If, on the other hand, an instruction to end the display of the shooting mode selecting menu is issued without a shooting mode being determined, the following processing is performed. The system control unit 108 reads the settings of the digital camera 100 for the current shooting mode stored in the nonvolatile memory 111, and changes the settings of the respective blocks of the digital camera 100, whereby the information regarding the shooting mode can be restored from the shooting mode temporarily selected during the display of the shooting mode selecting menu to the originally selected shooting mode. Then, the system control unit 108 returns the process to S209.

If, on the other hand, an input from the selection key 124 is made together with the input from the shooting mode selecting switch 123 in S210, the system control unit 108 performs the following processing. The system control unit 108 determines whether the information regarding the current shooting mode stored in the nonvolatile memory 111 is a shooting mode managed as a shooting mode sharing the pre-determined relationship (S219). Here, it is assumed that the underwater mode and the beach mode are managed as shooting modes sharing the pre-determined relationship. In this case, the system control unit 108 determines in S219 whether the current shooting mode is the underwater mode or the beach mode. In the case where there are a plurality of groups of shooting modes that are managed as shooting modes sharing the pre-determined relationship, the system control unit 108 determines in S219 whether there is a group including the current shooting mode.

If the current shooting mode is the underwater mode or the beach mode, the system control unit 108 further determines whether the current shooting mode is the underwater mode (S220). If the current shooting mode is the underwater mode, the system control unit 108 changes the information regarding the current shooting mode stored in the nonvolatile memory 111 to the beach mode (S221). If, on the other hand, the current shooting mode is the beach mode, the system control unit 108 changes the information regarding the current shooting mode stored in the nonvolatile memory 111 to the underwater mode (S222).

The system control unit 108 reads the settings of the digital camera 100 for the current shooting mode stored in the nonvolatile memory 111, and changes the settings of the respective blocks of the digital camera 100 in accordance with the read settings (S223).

As described above, when a particular input is made simultaneously when the shooting mode selecting switch is pressed, the image capturing apparatus of the present embodiment switches the shooting mode to another shooting mode that is managed as a shooting mode sharing a pre-determined relationship with the current shooting mode, whereby the user can switch between shooting modes that are frequently switched with a simple operation. In the case where there are three or more shooting modes that are managed as shooting modes sharing the pre-determined relationship, the shooting modes included in the managed group may be sequentially switched each time a particular input is detected simultaneously when the shooting mode selecting switch is pressed.

As described above, according to the present embodiment, the current shooting mode is switched to another shooting mode that is managed as a shooting mode sharing a pre-determined relationship with the current shooting mode in the case (1) where a particular input is made when the power is turned on or in the case where (2) a particular input is made together with an input from the shooting mode selecting switch in a shooting standby state.

(3) When displaying a shooting mode selecting menu by an input from the shooting mode selecting switch, sorting is performed such that the current shooting mode and a shooting mode sharing the pre-determined relationship with the current shooting mode are displayed high in the menu.

The configurations (1) and (2) enable switching to a shooting mode sharing a pre-determined relationship by simply operating the power button or the shooting mode selecting switch while pressing a particular button, instead of going through the steps of displaying a menu screen, selecting a desired shooting mode from the selection options and determining the desired shooting mode. Accordingly, even when the operable buttons are limited due to, for example, the digital camera 100 being installed into a waterproof case for underwater shooting, it is possible to easily switch between the underwater mode and the beach mode. In addition, because switching between other shooting modes that share the pre-determined relationship can be easily performed as well, it is possible to quickly switch between shooting modes and perform shooting.

Furthermore, with the configuration (3), because shooting modes sharing the pre-determined relationship are collectively displayed at the top of the menu, it is possible to easily select a mode to which the shooting mode is switched, and therefore the effort and time required for switching between shooting modes can be reduced.

For the sake of simplicity of the description and ease of understanding, the present embodiment has been described in the context of the digital camera 100 having all of the configurations (1) to (3), but it is easily understood that the configurations (1) to (3) can be implemented with an arbitrary combination of one or more thereof.

Because the shutter button and the power button are operation members that need to be used even when the digital camera 100 is installed in a waterproof case, the present embodiment is configured such that switching between the underwater mode and the beach mode is performed by simultaneously pressing these two buttons.

If an operation of simultaneously pressing the shutter switch and the power switch is assigned to perform changing to a mode other than the underwater and beach modes, a situation may occur in which inoperable functions are displayed or in which the mode selecting button cannot be used when the digital camera 100 is installed in a waterproof case. In such a case, the digital camera 100 has to be taken out of the waterproof case in order to revert to the underwater or beach mode.

Accordingly, in order to avoid situations that require the installation and removal of the digital camera 100 into and from the waterproof case, it is advantageous to configure the digital camera 100 described above such that, when the shutter switch and the power switch are simultaneously pressed while the underwater or beach mode is set, the shooting mode is switched only to a mode associated with the underwater and beach modes and not to any other mode.

It is also possible to employ a configuration in which the shooting mode is switched to either the underwater mode or the beach mode even when the shutter switch and the power switch are simultaneously pressed in a mode other than the underwater and beach modes, for example. In this case, similar to the above, it is advantageous that when the power switch and the shutter switch are pressed simultaneously after the shooting mode has been switched to the underwater mode or the beach mode, the shooting mode is not switched to a mode other than the underwater and beach modes.

Next, another embodiment of the present invention will be described. The present embodiment relates to shooting mode switching when the digital camera 100 is turned on (at the time of start-up), as in Switching Control Process on Start-Up of above-mentioned embodiment.

Figure 3:
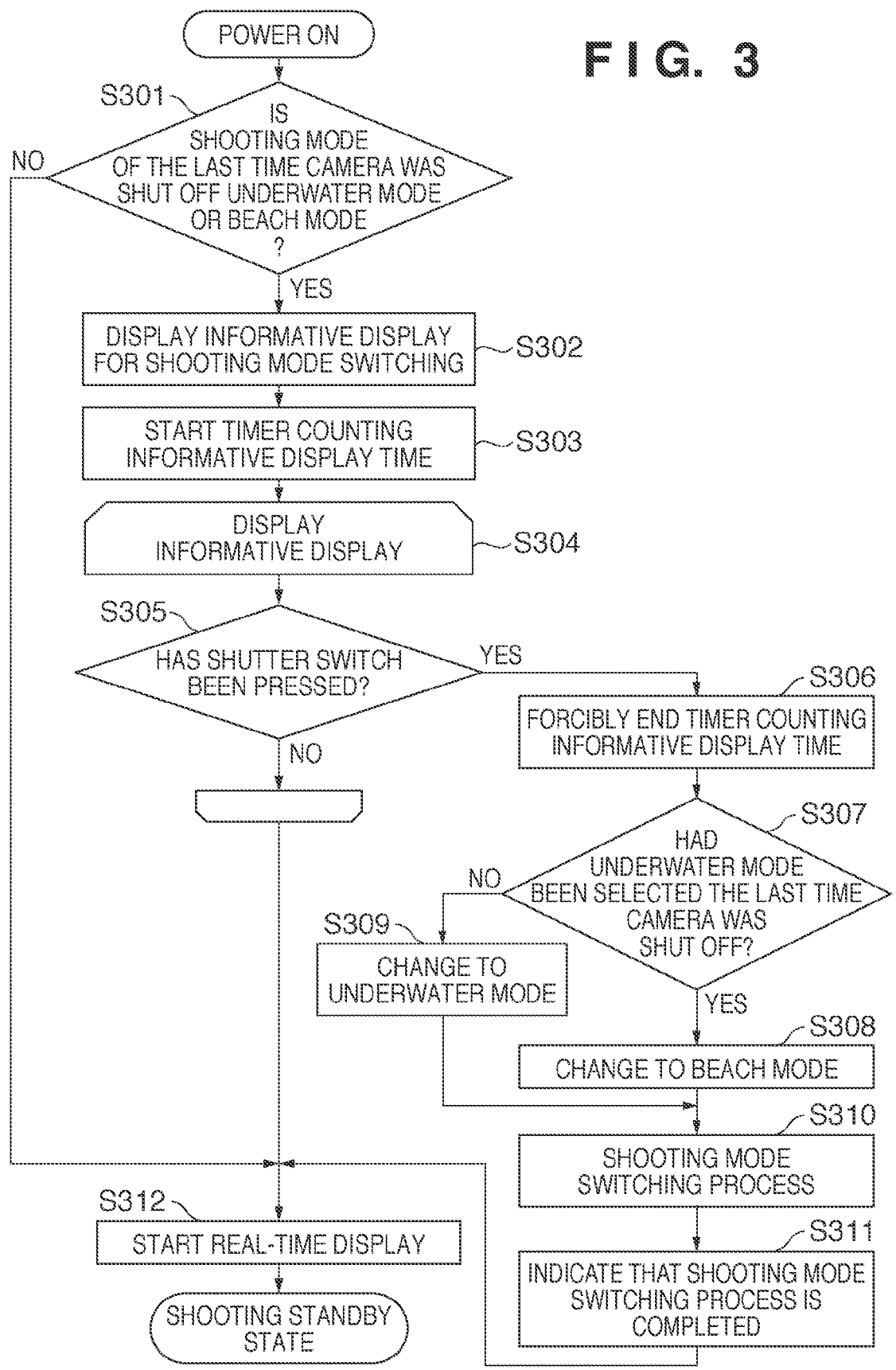
FIG. 3 is a flowchart illustrating a shooting mode switching process of a digital camera according to another embodiment.

The configuration of the digital camera 100 of the present embodiment can be the same as that of above-mentioned embodiment. A shooting mode switching process performed at the time of start-up by a digital camera 100 according to present embodiment will be described with reference to the flowchart shown in FIG. 3.

When the power is turned on through an operation of the power switch 121, the system control unit 108 checks whether the information regarding the shooting mode of the last time the digital camera 100 was shut off that was stored in the nonvolatile memory 111 is a shooting mode to be subjected to a switching control process on start-up (S301). In this example, it is assumed that the underwater mode and the beach mode are modes to be subjected to the switching control process on start-up, as in above-mentioned embodiment. If the shooting mode of the last time the digital camera 100 was shut off was neither the underwater mode nor the beach mode, the system control unit 108 advances the process to S312.

If, on the other hand, either the underwater mode or the beach mode had been set the last time the digital camera 100 was shut off, the system control unit 108 reads an informative display regarding the switching control process on start-up, which is stored in the nonvolatile memory 111, and displays the informative display on the display unit 104 (S302). As the informative display, for example, a message is displayed indicating that the shooting mode can be (sequentially) switched to shooting modes to be subjected to the switching control process on start-up excluding the currently selected shooting mode by performing a particular operation, for example, pressing the shutter switch 122, during the display of the informative display.

The system control unit 108 starts a timer that counts the display time of the informative display at the same time it displays the informative display on the display unit 104 (S303). When the time counted by the timer reaches the time stored in the nonvolatile memory 111, the system control unit 108 ends the informative display, and advances the process to S312. The steps from S304 to S306 are repeated during the display of the informative display.

The system control unit 108 determines whether a particular operation displayed on the informative display has been made, for example, whether the shutter switch 122 has been pressed, during the display of the informative display (S305). If the shutter switch 122 is pressed during the display of the informative display, the system control unit 108 forcibly ends the timer counting the display time of the informative display, and ends the display of the informative display (S306).

Then, the system control unit 108 determines whether the shooting mode of the last time the digital camera 100 was shut off was the underwater mode (S307).

If the shooting mode of the last time the digital camera 100 was shut off was the underwater mode, the system control unit 108 switches the shooting mode of the digital camera 100 to the beach mode (S308). Specifically, the system control unit 108 changes the information regarding the current shooting mode stored in the nonvolatile memory 111 to the beach mode.

Similarly, if the shooting mode of the last time the digital camera 100 was shut off was the beach mode, the system control unit 108 changes the shooting mode of the digital camera 100 to the underwater mode and stores the change (S309). Then, the system control unit 108 reads the settings of the digital camera 100 for the current shooting mode stored in the nonvolatile memory 111, and changes the settings of the respective blocks of the digital camera 100 in accordance with the read settings. When the switching of the shooting mode is completed, the system control unit 108 reads a switching complete display, stored in the nonvolatile memory 111, indicating that the switching of the shooting mode is completed, and displays the switching complete display on the display unit 104 (S311). The system control unit 108 ends the switching complete display when, for example, the display time of the switching complete display stored in the nonvolatile memory 111 elapses.

In S312, as in S208 of above-mentioned embodiment, in order to cause the display unit 104 to function as an electronic viewfinder, the system control unit 108 starts a live view display operation. In this state, the digital camera 100 goes into a standby state for shooting, and shooting is possible with an operation input to the shutter switch 122. After this step, the process from S209 shown in FIG. 2A may be executed.

As described above, according to the present embodiment, upon the power being turned on, it is determined whether or not any one of a plurality of shooting modes sharing a pre-determined relationship that are managed as a group had been set the last time the digital camera 100 was shut off. If any one of the plurality of shooting modes managed as a group had been set, upon a particular operation made within a specified period of time, the shooting mode is switched to another shooting mode that is managed in the group. Accordingly, the same effects can be obtained without performing an operation to turn on power while inputting a particular input, as performed in the switching control process on start-up of above-mentioned embodiment.

Other Embodiments

In embodiments described above, the shooting mode switching process is performed with an operation of one or a combination of the shutter switch 122, the shooting mode selecting switch 123 and the selection key 124. However, the operation may be replaced by, for example, an operation of other switches provided in the operation switch unit 109, or a setting unit may be provided with which the user can set a switch or a combination of switches to perform the operation.

In embodiments, as the switching control process on start-up, a process was described in which the shooting mode is switched by using only the power switch 121 and the shutter switch 122. This switching process is useful particularly under shooting conditions in which operable switches are limited such as when the digital camera 100 is installed into a case that enables underwater shooting and shooting is performed as described above.

Furthermore, in the above embodiments, the underwater mode and the beach mode are used as examples of shooting modes sharing a pre-determined relationship, but the implementation of the present invention is not limited thereto. For example, because the shooting modes including nightscape mode, night snapshot mode and fireworks mode are likely to be used under the same shooting environment, that is, during night time shooting, they can be handled as shooting modes sharing the pre-determined relationship. In this case, the nightscape mode, the night snapshot mode and the fireworks mode can be used as in embodiment by switching them in this order each time the shooting mode is switched. It is also possible to provide a function of learning from a selection history of shooting modes selected by the user and handle the shooting modes that are frequently switched by the user as shooting modes sharing the pre-determined relationship. In this case as well, the shooting modes are not limited to the factory-default shooting modes stored in the digital camera 100, and may include shooting modes that are set by the user. In addition, it is also possible for the user to establish, from among the factory-default shooting modes stored in the digital camera 100, a group of shooting modes sharing a pre-determined relationship.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-161240, filed on Jul. 7, 2009, which is hereby incorporated by reference herein in its entirety.

What is claimed is:

1. An image capturing apparatus having a plurality of shooting modes comprising:
   a plurality of operation members which include a least a mode selecting button, a power button and a shutter button, wherein the mode selecting button, the power button and the shutter button are separate buttons; and
   a mode changing unit which sets one of the plurality of shooting modes, including at least a normal mode, an underwater mode and a beach mode,
   wherein the underwater mode and the beach mode share a pre-determined relationship to each other and are modes which are used with installing the image capturing apparatus in a waterproof case,
   wherein the mode selecting button is a button for instructing the mode setting by the mode changing unit and is not operable in a case where the image capturing apparatus is installed in the waterproof case, and
   in a case where one of the underwater mode and the beach mode is set, the mode changing unit changes the mode to another one of the underwater mode and the beach mode in response to an operation that the power button and the shutter button are both operated by a user at the same time.

2. The image capturing apparatus according to claim 1, wherein when the image capturing apparatus is installed in the waterproof case, the power button and the shutter button are operable whereas operable operation members of the plurality of operation members are limited.

3. The image capturing apparatus according to claim 1, wherein the underwater mode and the beach mode are modes in which usable operation members provided in the image capturing apparatus are limited.

4. The image capturing apparatus according to claim 1, wherein in a case where the underwater mode or the beach mode is set, the mode changing unit does not change to a shooting mode other than the underwater mode and the beach mode in response to the operation that the power button and the shutter button are both operated by a user at the same time.

5. The image capturing apparatus according to claim 1, wherein the beach mode is a mode in which people can be captured even against the ocean surface or beach where sunlight is strongly reflected without making the people dark.

6. A method for controlling an image capturing apparatus having a plurality of shooting modes, wherein the image capturing apparatus has a plurality of operation members which includes at least a power button and a shutter button, the method comprising:
   a mode changing step of setting one of the plurality of shooting modes, including at least a normal mode, an underwater mode and a beach mode,
   wherein the underwater mode and the beach mode share a pre-determined relationship to each other and are modes which are used with installing the image capturing apparatus in a waterproof case,
   wherein the mode selecting button is a button for instructing the mode setting by the mode changing unit and is not operable in a case where the image capturing apparatus is installed in the waterproof case, and
   wherein in a case where one of the underwater mode and the beach mode is set, the mode changing unit changes the mode to another one of the underwater mode and the beach mode in response to an operation that the power button and the shutter button are both operated by a user at the same time.

7. An image capturing apparatus having a plurality of shooting modes comprising:
   a plurality of operation members which each receive operation inputs from a user; and
   a mode changing unit which sets one of the plurality of shooting modes, including at least a normal mode and a plurality of particular shooting modes that share a pre-determined relationship to each other, where the plurality of particular shooting modes are modes that are used with installing the image capturing apparatus in a waterproof case,
   wherein the plurality of operation members include a first operation member for use in instructing to change the mode set by the mode changing unit, said first operation member not being operable in a case where the image capturing apparatus is installed in the waterproof case, and
   wherein the mode changing unit, in a case where one of the particular shooting modes is set, switches to another particular shooting mode in response to operation of the one or more operation members of the plurality of operation members other than the first operation member, and in a case where the normal mode is set, maintains the normal mode without switching the mode even when the operation occurs of the one or more operation members of the plurality of operation members other than the first operation member.

8. The image capturing apparatus according to claim 7, wherein the one or more operation members of the plurality of operation members other than the first operation member are second and third operation members both operated at the same time by a user.

* * * * *